Aug. 15, 1939.  C. KANGAS  2,169,697

DRILL STEM COUPLING

Filed April 22, 1938

Inventor
Charles Kangas
By
[signature]
Attorney

Patented Aug. 15, 1939

2,169,697

UNITED STATES PATENT OFFICE 2,169,697

DRILL STEM COUPLING

Charles Kangas, Embarrass, Minn.

Application April 22, 1938, Serial No. 203,687

2 Claims. (Cl. 287—119)

This invention relates to drill stems, rod couplings or the like and more particularly to a new and improved such construction.

In the drilling of oil wells and other bore holes the stem swivels to a certain extent in the boring operations and in the past it has been necessary to secure adjacent sections of the drill stems together in a rigid connection which must be broken when the depth of bore hole has been attained and the drill stem withdrawn. The usual construction has made use of threaded joints which are easily damaged and which on occasion become locked together and are exceedingly difficult to separate and some times cannot be separated. To break these drill joints it has been necessary to use so-called pipe tongs which are very heavy, bulky, awkward to handle and some times even require the use of a derrick or a crane to raise and lower them into position.

It is an object of the present invention to provide a construction which will avoid one or more of the foregoing difficulties. A further object is to provide a coupling which entirely eliminates the heavy pipe tongs heretofore mentioned, which sometimes weigh in the neighborhood of several hundred pounds. Another object of the invention is to provide a coupling which can be very quickly assembled and which can be very rapidly taken apart.

I have obtained the foregoing objects and advantages by providing a coupling means having stud and socket elements which are secured together by means of a transversely extending key.

The invention will be further understood and additional advantages will be pointed out in the following specification when taken in connection with the accompanying drawing, made a part thereof and wherein like reference characters indicate corresponding parts in the various figures.

Figures 1, 2:
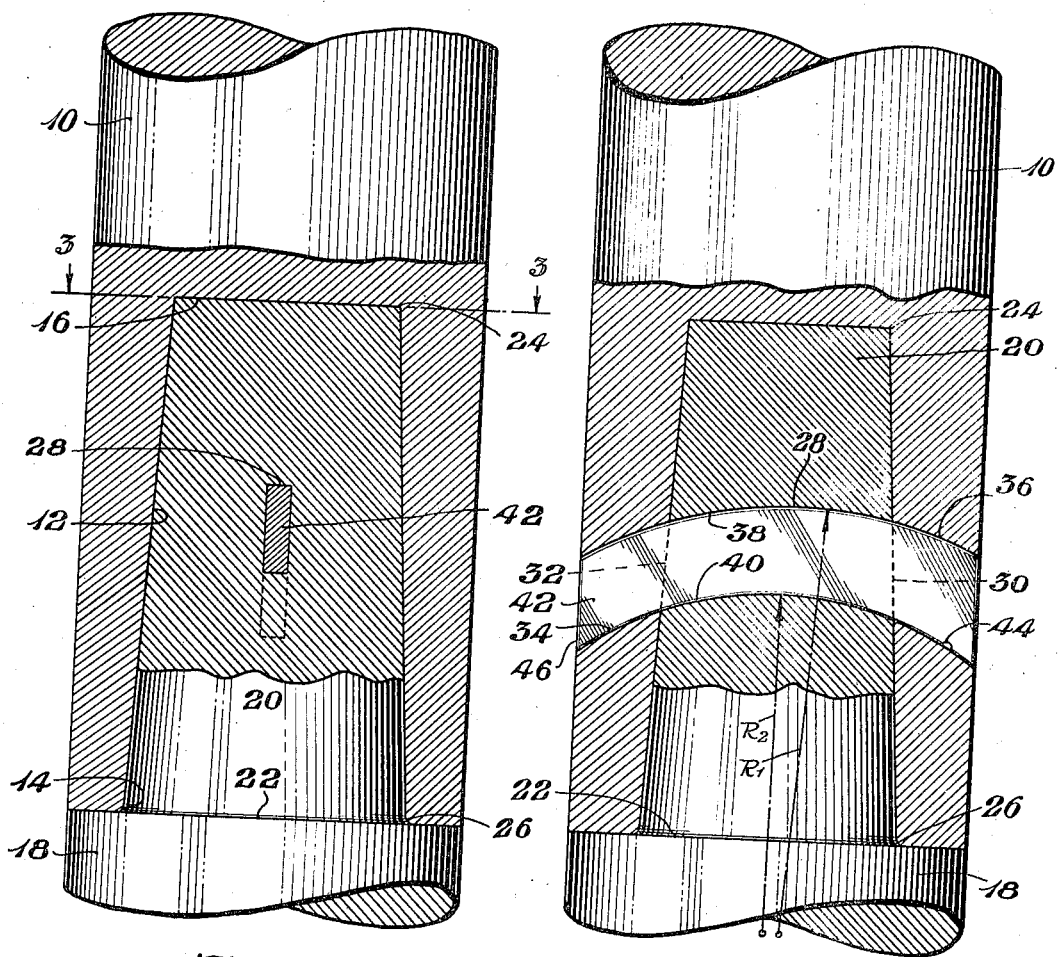
Figure 1 is a vertical elevation of a coupling as made in accordance with the present invention partly broken away and partly in section.
Figure 2 is a similar section being taken at right angles to the section in Figure 1.

Considering the drawing in greater detail a small section of a rod connection or drill stem coupling is shown. The lower end of the upper element 10 of the rod is provided with a socket 12 tapering inwardly and gradually decreasing in cross section from the outer end 14 to the inner end 16.

Figure 3:
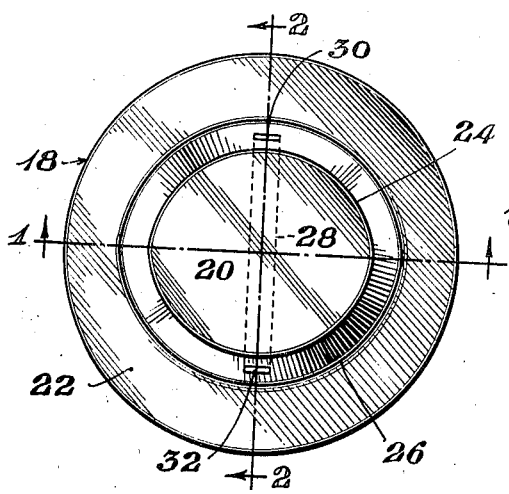
Figure 3 is a plan view of the stud element taken substantially on the line 3—3 in Figure 1.

The lower element of the coupling shows the upper end 18 of a rod or drill stem having a stud 20 of reduced section projecting outwardly from the end of the main body. The stud portion is tapered outwardly having the largest cross section adjacent the shoulder 22 of the member. This outwardly tapering section is readily observed in Figure 3 wherein the transverse section of the stud is shown as having substantially the shape of an ellipse. It, of course, will be readily understood that slight variations in shape may be made without departing from the true spirit of the invention. The outer end of the stud has a relatively small area ellipse 24 as its limiting section, and has the base 26 as an ellipse of appreciably greater area.

In assembling the coupling the stud and socket are forced together. In this connection it may be desirable to have the degree of taper in the socket somewhat less than the degree of taper on the stud so that a slight amount of play may be provided. This, however, is not necessarily essential. The elliptic shape of the stud and socket automatically aligns the parts and the slots.

To firmly secure the stud and socket in assembled relation the stud is provided with a slot 28 extending transversely therethrough. This slot is substantially rectangular in transverse cross section but need not necessarily have this configuration. Each end of the slot has an opening as at 30 and 32 in the tapering faces of the stud walls. The socket is similarly provided with arcuate slots 34 and 36 which match up with the slot 28 in the stud so as to complementally form one continuous slot. This slot is preferably made with the upper and lower arcs 38 and 40 being of different radii, such as R1 and R2. In this way the arcuate section of the slot as viewed in Figure 2 clearly shows a slot of slightly increasing depth as viewed from left to right.

When the stud and socket are assembled and the slot has become aligned the final step in securing the parts together is to drive home the key 42. This key in its initial shape may be a metal member having an upper edge and end walls which are straight and at right angles to each other and with a lower wall of gradually increasing depth. When such a key is forced into the slot it will assume the arcuate shape shown in Figure 2. For ease in taking the joint apart the key member is provided with a groove or slot 44. When the left hand face 46 of the key 42 is struck a sharp blow the key is loosened and forced to the right. At such a time an appropriate tool may be caught in the groove 44 and used to pry the key out of the slot.

Although a preferred embodiment of the invention has been illustrated and described it will be readily understood that variations within the true spirit and scope of the same are to be determined by the appended claims.

I claim:

1. A drill stem or rod connection comprising separable pin and socket members having an arcuate slot extending transversely therethrough, the arcuate walls of said slot being determined by radii having different centers whereby a wedge shaped arcuate slot is defined, and a similarly shaped key in said slot, the uniform curvature of said slot and said key being such as to provide for insertion and removal of the key without deformation of said key.

2. A drill stem or rod connection comprising separable complementary pin and socket members provided with a transversely disposed uniformly curved arcuate slot and a uniformly curved key in said slot for locking the pin and socket members together, the uniform curvature of said slot and said key providing for the insertion and removal of the key without deformation thereof.

CHARLES KANGAS.